United States Patent Office 2,896,267
Patented July 28, 1959

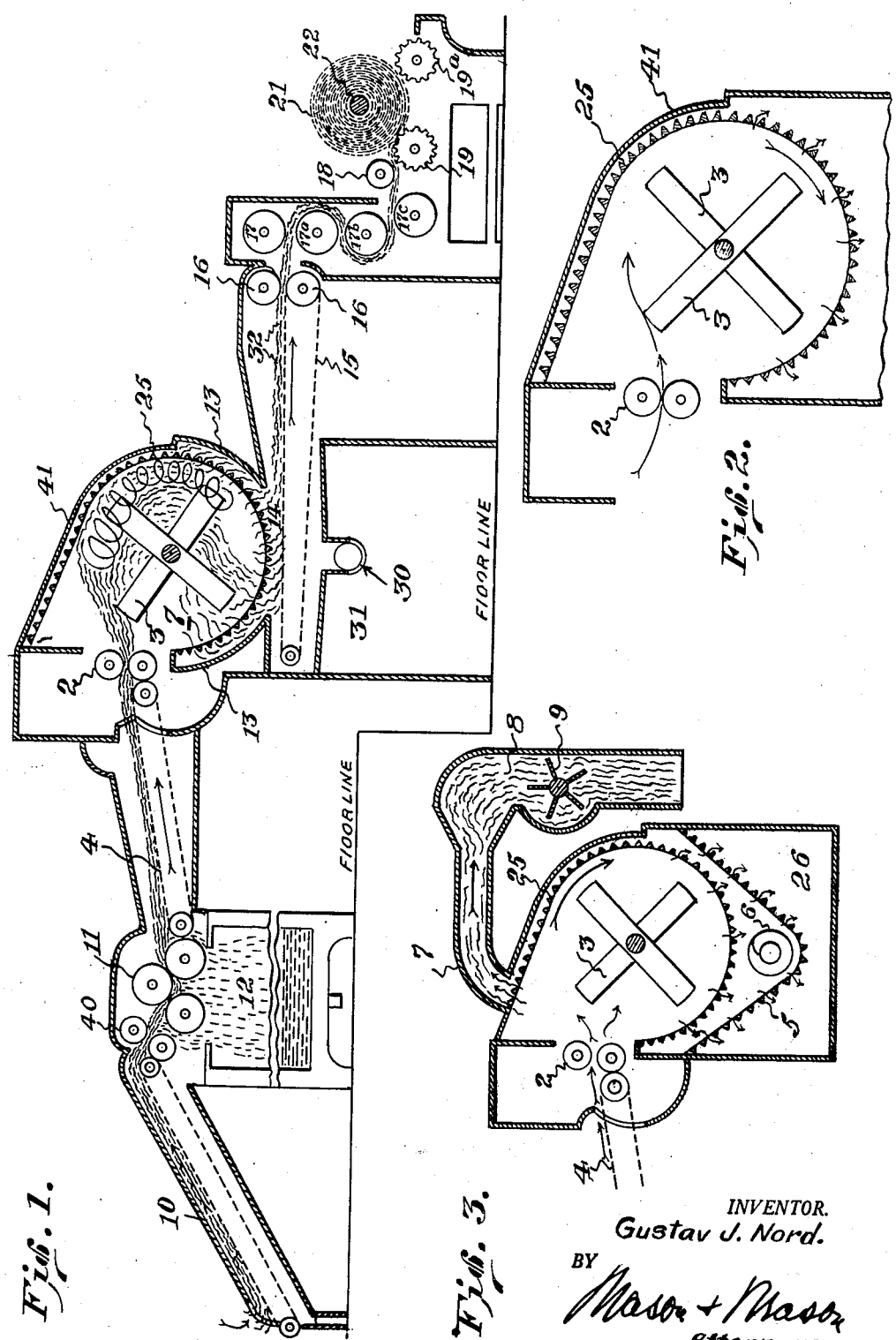

2,896,267

FABRICATION OF PRODUCTS FROM AGAVE LECHUGUILLA

Gustav J. Nord, Asheville, N.C.

Application November 26, 1957, Serial No. 699,133

5 Claims. (Cl. 19—8)

This invention relates to an improvement in the extraction of natural products found in the *Agave lechuguilla* plant and related species such as ixtle, Tampico, palma, tula, jaumauve, henequen, maguey and fibers from the various species of Yucca. Because of the abundance and ease of harvesting and the many valuable natural products found in the *Agave lechuguilla* plant, particular reference will be had to that species, but it is to be understood that this invention embodies processes which may be directed to the above referred to related species as well.

This application is a continuation-in-part of my application Serial No. 461,405, filed on October 11, 1954, now abandoned.

The *Agave lechuguilla* plant constitutes an excellent domestic source for valuable fibers, saponin, chlorophyll concentrates, protein feed products, and other technologically valuable products.

It is an object of the present invention to process plants of the *Agave lechuguilla* and related species in such a manner that a maximum recovery of all the above described products is realized.

To my knowledge there are various processes for treating plant matter, including the *Agave lechuguilla*, for the recovery of one or several of the valuable products contained in those plants. However, there is no process which enables substantially all of the valuable products to be recovered in commercially feasible amounts, since prior art methods are directed to the recovery of either chloroplast pigments and saponaceous concentrates or fibers, which methods often destroy or reduce the recovery of one or more of the valuable products in favor of another.

For instance, in my Patent No. 2,121,210 there is disclosed a process of and apparatus for isolating and treating such plants which involves the process of running the leaves through scrapers and subjecting the leaves to pressure from rolls which spread the fibers and separate them from the pulp. However, it has been found that such scraping means prevent the production of a maximum yield of the long fibers and is somewhat limited in completely removing the pulpy matter which contains acids and other deleterious matter which subsequently weakens the fibers.

In my Patent No. 2,210,463 there is disclosed a process for recovering the juices of the Agave plant wherein the fibers are destroyed. Likewise my Patent No. 2,301,787 is directed to the recovery of saponin from these plant sources, and is not concerned with an overall process which contemplates the maximum recovery of all of the products contained in this valuable chemurgic crop.

Recently it was found that the use of radiant energy under certain conditions greatly assists the separation of the pulp from the fiber and permits a high recovery of the saponin-containing juice. At the same time, the use of radiant energy tends to arrest the action of enzymes which promote degradation of the fibers. Thus a process for the recovery of a number of valuable products from the Agave plant is feasible on a commercial scale. Methods which use radiant energy are disclosed in my pending application Serial No. 651,171, filed April 8, 1957.

In the practice of my invention, a maximum recovery is made of high strength, resilient textile fibers, and the juice from the plant, which contains not only chlorophyll concentrates, saponins, but also protein feed products and complete carbohydrates in the residual pulp. Further, it is possible to effect extremely good separation of the pulp from the juice and fibers. In this connection, it is worth while to note that such a separation is necessary at the time the plant is treated, not only because subsequent steps effecting such separation are costly, but also because the pulp contains acidic matter which is deleterious to the strength of the fibers if permitted to remain in contact or close association with the fibers for any length of time.

Referring to the drawings:

Figure 1 is a side elevation of a preferred apparatus for carrying out the process;

Figure 2 is a partial side elevation of the modified hammer mill illustrating the direction of travel of the dejuiced leaves and their contact between hammer tips and grid bars; and Figure 3 is a side elevation of the modified hammer mill with a modified fiber discharge.

As shown in Figure 1, the leaves and other succulent parts of the plant may be processed in the fresh or green state, or they may be first heated, preferably according to the teaching of my co-pending application Serial No. 651,171, and while still in a heated condition they may be placed on conveyor apron 10 and continuously fed to the adjustable crusher 40 and press rolls designated at 11. These rolls preferably are maintained at a pressure of 80 to 250 lbs. per square inch, and not only effectively squeeze out the juice into container 12, but also rupture the epidermis of the leaves and spread the fibers in the leaves and thereby loosen the pulp, enabling subsequent separation of the pulp from the fibers. The arrangement of rolls as seen in Figure 1 insures that substantially all of the valuable juice will be effectively removed. Other apparatuses such as presses may be used to dejuice the succulent parts of the plants, but I prefer to use pressure rolls.

The container 12 may be provided with a screen (not shown), and any matter which is deposited thereon will be retained until removal. The residue of extremely short fibers and small deposits of pulp may be collected on the screen and removed.

Thereafter, the ruptured and pressed leaves containing the valuable fiber are deposited on conveyor apron 4 and continuously conveyed to feed rolls 2 located at the opening of a defiberizing and cleaning machine chamber 1, in which the fibers are effectively separated from the epidermis and the binder components of the leaves, the bulk of which at this point is parenchymous pulp.

As a result of considerable experimentation, it has been found that the separation of fiber from the pulp is best effected in a machine equipped with a series of suitably driven and appropriately shaped blade hammers to strike a fringe of dejuiced leaves, which is presented to them by a revolving pair of feed rolls.

As shown in Figure 2, feed rolls 2 are adapted to receive the dejuiced leaves and continuously feed the leaves into the chamber housing and in the space defined by the modified hammer mill blades 3 and grid bars 25. These blades are rotated clockwise and are designed to beat out the pulp from the dejuiced and pressed leaf and force the fiber stock against grid bars 25. These grid bars may be adjusted so that their triangular-shaped sides reverse the direction of the contacting fibers and the fibers rebound in a direction counter-clockwise and contra to the direction of the moving fibrous mass and again become subjected to the action of the blade hammers instead of continuously moving with them.

This step of causing the fibers to rebound and be subjected to the action of the blade hammers is deemed especially important, since it has the desired effect of removing substantially all of the pulp, enabling the fibers to be baled for shipment or subsequently further processed without additional cleaning. If the pulp is not removed, subsequent steps effecting such removal are necessary because of the deleterious effect of the pulp on the strength of the fibers, and subsequent processing costs would probably render the process of recovery of fibers commercially unfeasible.

Hammer mills are well know to those skilled in the art. Preferably the steel blades will be of the semi-fixed type, and I have successfully employed a hammer mill which contains 11 steel hammer blades running across the width of the machine which defines a cylinder having a diameter of about 27 inches. A hammer cylinder having a diameter of rotation substantially larger than 27 inches is somewhat limited in that its circumference is too large and does not allow the grid bars to be completely effective. A high angle of curvature of the grid bars about a cylinder of 27 inches or less causes the dejuiced leaves to strike the grid bars a maximum number of times in an arcuate path before passing through the bars, and therefore maximum cleaning is accomplished. Of course these dimensions and specifications are especially suitable for the *Agave lechuguilla*, but may be altered depending on the plant matter to be treated. A barrier apron 41 extends about the outer circumference of the grid bars for about half the length of the grid bars.

There are many types and sizes of hammer mills which can be used on a greater variety of materials than any other type of machine. The hammer mill can be used as a crusher or pulverizer, and the character of the finished product is determined, to a large extent, by the shape of the hammers and the shape of the cage bars. The hammermill, when modified as in the present application is, in prinpicple, a breaker picker similar to those used in opening and cleaning cotton prior to carding and spinning, i.e., the individual hammer blades can be replaced with a rotor having a three-bladed type of beater which consists of three steel blades that are fastened to arms which are mounted on the beater shaft. With this arrangement, equally good results can be obtained in freeing the fiber from pulp and other extraneous matter. I have successfully used in my process to No. 13-R Papec mill, manufactured by the Papec Machine Company, Shortsville, New York, operating it without the 3-ply hammer tips attached to the hammer blades and without the positive feed (auger) delivery.

The cylinder is rotated at a speed from 800 r.p.m. to 2000 r.p.m., giving relatively long fibers at the slower speed and progressively shorter fibers at the faster rates of speed. These fibers may be subsequently used in their original lengths which may be as much as 20 inches in length, or they may be reduced to any desired staple length or lengths ranging from one-half inch to four inches or more.

As noted above, the hammer cylinder is preferably surrounded for about three-quarters of the diameter of its circumference by triangular-shaped grid bars, which are space arranged so as to be adjustable as to angularity to the surface of the hammers. The dejuiced leaf material receives a large number of blows within the cylinder by the beating hammers, about 35,000 to 88,000 per minute, and is thrown with considerable force against the grid bars. The combination of beating hammers and grid bars which receive the impact of the fibers further serves to loosen the pulp, and the latter scrape the pulp from the fibers as the dejuiced leaves advance clockwise around the cylinder.

Figure 3 shows a modified hammer mill identical to that in Figs. 1 and 2, except that the discharge arrangement provides for the disposal of the fibers in a loose arrangement, and thereafter they may be baled for shipment or passed directly to a web-forming belt conveyor for the production of bonded mat products. Alternatively, they may be passed to any suitable apparatus for the production of mechanical or chemical pulp.

As the leaves are rotated, the fibers become further separated, and the laosened pulp and other impurities which are struck down with the pulp fall between the curved grid bars 5 at the underside of the cylinder into pulp chamber 26, as shown in Figure 3. The fibers are collected within the apex of curved grid bars 5 by a screw conveyor 6 which passes over the length of grid bars 5 which serves to further scrape the fibers over the grids, sifting out the loose pulp and impurities which fall down in the pulp chamber as the fibrous mass is carried to a delivery pipe 7 where the fiber is drawn through, either by the current of air generated by the rapidly moving hammer cylinder, or by an independent fan (not shown) which blows or sucks the fibrous material into the vertical duct 8 in which a paddle wheel 9 thoroughly mixes the fibers and forces the material down in a loose and floating state.

Referring back to Figure 1, after the fibers have been separated from the pulp, they are deposited on web conveyor 15. The lower half of the hammer cylinder is shielded by two curved steel deflector plates 13, with an opening 14 through which the fibers are distributed in random orientation on the apron of web conveyor 15. The thickness of the sheet may be governed by increasing or decreasing the speed of the conveyor. Conveyor 15 may be formed of grid bars or suitable wire screen material through which any loose particles of pulp will drop into the chamber 31 underneath the conveyor. The air draft passing out through the openings in the web conveyor 15 carries with it the pulp which is then forced out through the pulp exhaust pipe 30 into any suitable receptacle.

The web conveyor carries the fibers to delivery rolls 16, and, because of the draft between the rolls 16 and 17, the web becomes drawn out to a relatively thin sheet of fibers 32 placed in random orientation.

The sheet of fibers is then drawn, in serpentine fashion, between the presser rolls 17, 17a, 17b, 17c, between rolls 18 and 19, and round the lap roll 20 that rests on the fluted calender rolls 19, 19a which revolve and cause the lap roll to wind on the sheet of compressed fibers in the form of a compact lap 21.

As is known, to produce a textile fabric of any description, with the exception of fabrics made from synthetic continuous filament yarns, the fibers must be subjected to the conventional steps of carding, spinning and weaving. In producing a bonded web fabric, a web or mat of fibers is held together with applied bonding material or by the fusing of thermoplastic fibers interspersed through or blended in the web or mat to form a sheet of desired thickness, flexibility and resiliency. Accordingly, adhesive is supplied to the sheet of fibers at some point between opening 14 in the deflector plates and delivery rolls 16 by a spray or other conventional means. It will be appreciated that a wide variety of agents may be employed in bonding the mat, depending upon the ultimate use of the end product. Such bonding agents include natural gums, elastomeric materials, synthetic resins, such as cellulose esters and ethers, thermoplastic and thermosetting resins, or combinations of these.

In this preferred process for forming a bonded mat of the fiber, as distinguished from discharging the fibers for baling, as shown in Figure 3, the cleaned fibers, either in their original lengths or after reduction to suitable staple lengths by the modified hammer mill, are deposited on the conveyor and compressed by the calender in the form of a compact rolled up sheet.

In carrying out the present invention for the production of fibers and other components from *Agave lechuguilla* and other plants, including those among the Agave species, I have found that such plants may be successfully processed irrespective of their sizes, ages or general condition. A desideratum in the operation is to process the leaves in such a manner as to secure high yields of fibers of best physical characteristics and in technically usable form, and to segregate the fibers from the expressed pulp or natural binder material with a minimum possible mechanical breaking or degradation of the fibers in the event it is desired to produce long fibers. Fibers of selected staple lengths can be readily produced by altering the speed of the modified hammer mill. The fibers from the genus Agave have been found to be strong and chemically resistant, enabling them to be treated with a variety of resins, etc. to form mats, etc.

It has been found that by using radiant energy to heat the leaves and other parts of the plant to be processed, not only does this result in a high yield of saponaceous juice and excellent separation of the juice and pulp from the fiber, but it further inhibits the action of enzymes and other microorganisms on the saponins and/or sapoginens. Thus it is to be preferred that the leaves be treated with radiant energy prior to extracting the juice, fibers, etc.

The *Agave lechuguilla* plant is remarkably well suited for use as a chemurgic crop, since it is virtually useless in its natural state and is considered a nuisance in areas where it is indigenous. It is easily raised in areas not suited for the production of typical agricultural crops. It can be processed to produce many valuable products, all of technological value, and at substantially high yields.

Summarized, the principal objects of my process are: (1) to dejuice the leaves and other succulent parts of the lechuguilla plant, etc.; (2) to remove the parenchemous pulp and other foreign matter; (3) to separate the fiber from the disintegrated pulp with minimum injury to the fiber's inherent characteristics, i.e., strength and resiliency; (4) if desired and on the same machine, to form the fiber into a layer or resilient mat and wind it, with or without adhesive, on a roll in a cylindrical form known in the textile art as a lap.

The above description and drawings disclose several embodiments of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. A process for extracting the natural products of the *Agave lechuguilla* plant and related species comprising the steps of dejuicing the succulent parts of the plant, feeding the dejuiced parts into contact with a plurality of rotating hammer mill blades at a speed of between 800 to 2000 r.p.m., said blades having a diameter of rotation not exceeding about 27 inches, subjecting the parts to the beating action of said blades, and thus forcing said parts against a plurality of adjustable and triangular-shaped grid bars in an arcuate path to separate the fibers from the pulp.

2. A process for extracting the natural products of the *Agave lechuguilla* plant and related species comprising passing the succulent parts of the plant through a series of crusher and press rolls to dejuice said parts, feeding the dejuiced parts into contact with a plurality of rotating hammer mill blades at a speed of between 800 to 2000 r.p.m., said blades having a diameter of rotation not exceeding about 27 inches, subjecting the parts to the beating action of the said blades, and thus forcing said parts against a plurality of grid bars in an arcuate path to separate the fibers from the pulp.

3. A process for extracting the natural products of the *Agave lechuguilla* plant and related species comprising the steps of dejuicing the succulent parts of the plant, feeding the dejuiced parts into contact with a plurality of rotating hammer mill blades at a speed of between 800 to 2000 r.p.m., said blades having a diameter of rotation not exceeding about 27 inches, subjecting the parts to the beating action of the said blades, and thus forcing said parts against a plurality of grid bars in an arcuate path eliminating pulp and thereafter depositing the fibrous mass in random orientation on a moving conveyor to form a mat, thereafter drawing the mat between presser rolls and winding said mat around a lap roll.

4. A process for continuously extracting the natural products of the *Agave lechuguilla* plant and related species comprising the steps of dejuicing the succulent parts of the plant, feeding the dejuiced parts into contact with a plurality of rotating hammer mill blades at a speed of between 800 to 2000 r.p.m., said blades having a diameter of rotation not exceeding about 27 inches, subjecting the parts to the beating action of said blades, and thus forcing said parts against a plurality of grid bars in an arcuate path, separating disintegrated pulp from the fibers of said parts by depositing said fibers on a screening material while permitting said disintegrated pulp to pass through said material.

5. A process for extracting the natural products of the *Agave lechuguilla* plant and related species comprising the steps of dejuicing the succulent parts of the plant, feeding the dejuiced fibrous mass into contact with a plurality of rotating hammer mill blades having a diameter of rotation not exceeding about 27 inches at a speed of between 800 to 2000 r.p.m., subjecting the fibrous mass to the beating action of the said blades, forcing the fibrous mass against a plurality of grid bars in an arcuate path and collecting the fibrous mass.

References Cited in the file of this patent

UNITED STATES PATENTS

| | | |
|---|---|---|
| 2,722,039 | McCrae | Nov. 1, 1955 |
| 2,729,856 | Horton et al. | Jan. 10, 1956 |